Patented Mar. 11, 1952

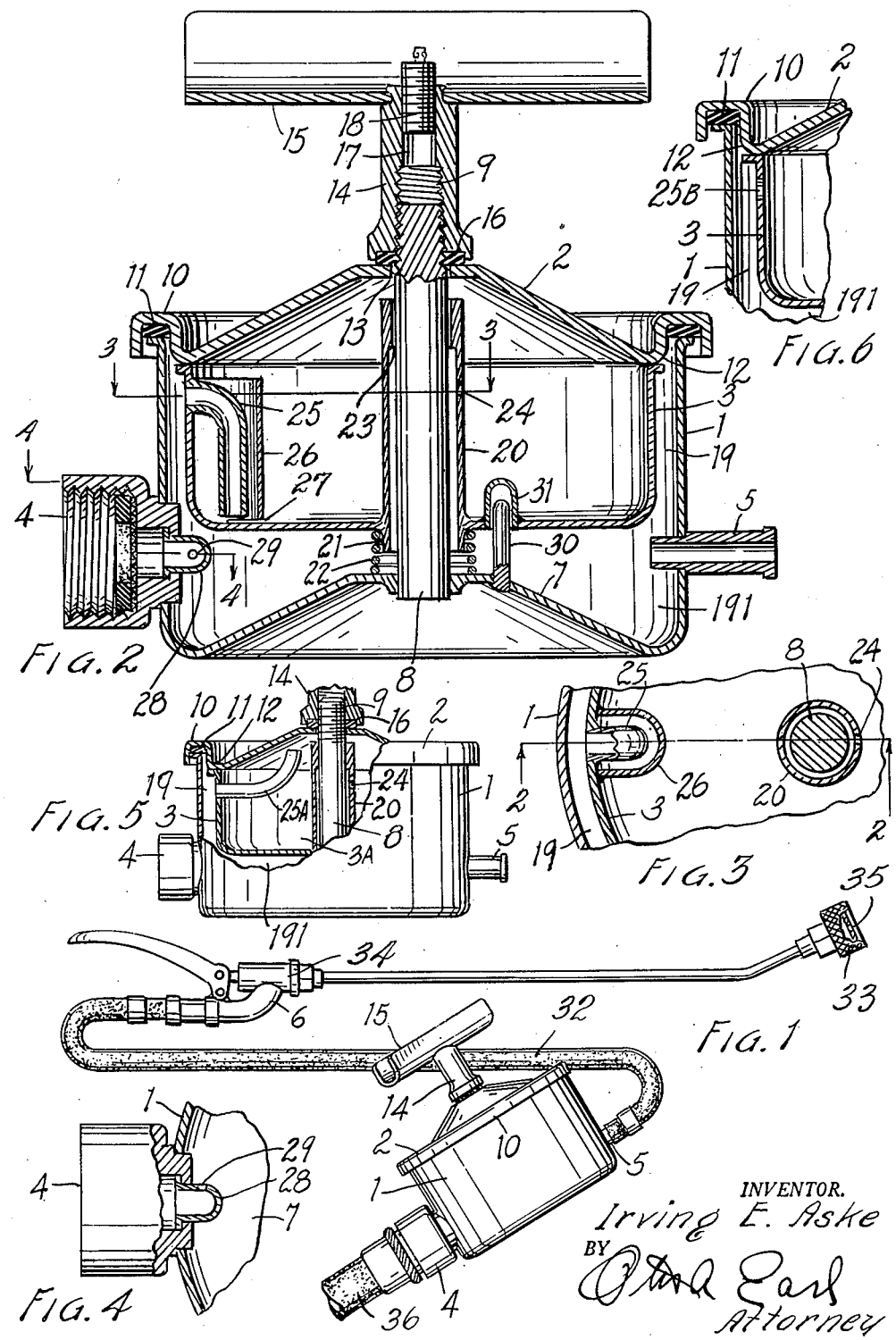

2,588,691

UNITED STATES PATENT OFFICE 2,588,691

MATERIAL DISSOLVER AND DISTRIBUTOR

Irving E. Aske, Muskegon, Mich.

Application August 17, 1949, Serial No. 110,752

14 Claims. (Cl. 299—84)

1

This invention relates to improvements in distributors for soluble weed destroyers, fertilizers and other water soluble chemicals.

This application is a continuation in part of my application filed September 3, 1948, Serial No. 47,736, now Patent No. 2,584,104, for Apparatus for Mixing and Distributing Weed Destroyer and Other Chemicals in Solution.

The main objects of this invention are:

First, to provide a device for distributing weed destroyer and other soluble chemicals in substantially constant concentration and one which is automatic in operation.

Second, to provide an apparatus for mixing and spraying or otherwise distributing weed destroyer and other chemical solutions in which substantial uniformity of the distributed solution is maintained until the supply of chemical is exhausted.

Third, to provide an apparatus having these advantages which may be connected to a water supply under pressure as by a hose and easily carried or moved about and has a valve control discharge nozzle associated therewith for controlling and directing the discharge as desired which also controls the flow of water through the mixing chamber of the apparatus.

Fourth, to provide an apparatus of this character which does not become clogged or inoperative and in which materials may be used having a considerable range of insolubility.

Fifth, to provide a distributor which provides a substantially constant concentration of solution regardless of variations in pressure and the amount discharged.

Sixth, to provide an apparatus embodying these several advantages which is easily operated and requires no particular skill on the part of the operator in so far as maintaining a suitable concentration of solution is concerned.

Seventh, to provide an apparatus of this character which is very simple in its parts and easily assembled and disassembled for charging.

Further objects relating to details and economies of the invention will appear from the description to follow. The invention is defined and pointed out in the claims.

Desirable embodiments of the invention are illustrated in the accompanying drawings, in which:

Fig. 1 is an elevational view of an embodiment of my invention, parts being broken away for convenience in illustration.

Fig. 2 is a view mainly in vertical central section on a line corresponding to line 2—2 of Fig. 3.

2

Fig. 3 is a fragmentary horizontal section on a line corresponding to line 3—3 of Fig. 2.

Fig. 4 is a fragmentary horizontal section on a line corresponding to line 4—4 of Fig. 2.

Fig. 5 is a side elevational view partially in vertical section and partially broken away in a modified form or embodiment of my invention designed for use with chemicals which form solutions lighter than water.

Fig. 6 is a fragmentary view in vertical section of another modified form or embodiment of my invention.

The embodiment of my invention illustrated is especially designed by me for the mixing and spraying of soluble weed destroyer, fertilizer and other chemicals as distinguished from chemicals in liquid form.

The structure illustrated comprises a cylindrical tank 1 having an open top adapted to be closed by the cover 2. The receptacle 3 for the soluble material to be distributed is also cylindrical and is disposed within the tank 1 with its walls in concentric relation to the walls of the tank. A coupling 4 is provided for the water supply connection which may be of any source but should be supplied under pressure. The discharge nipple 5 is adapted to receive the hose of the sprayer device indicated generally by the numeral 6. The bottom 7 of the tank is of generally concavo-convex form and somewhat springable under the pressure at which the water is commonly supplied. The post 8 is secured to the apex of the bottom and projects above the top of the tank, its upper end being threaded at 9.

The cover 2 is provided with a downwardly facing channel rim 10 having a gasket 11 seated therein which coacts with the upper edge of the tank. The cover is of generally concavo-convex form, the channel rim being upwardly offset providing an annular bead-like shoulder 12 within the rim which constitutes a seat for the upper edge of the receptacle 3. The cover is provided with a central opening 13 to receive the post 8. An elongated nut 14 is threadedly engaged with the upper end of the post and provided with an upwardly facing channel shaped handle 15 which serves as a carrying grip or hand hold for the device as well as for the hand piece for the nut. A gasket 16 is seated in the lower end of the nut for sealing the opening 13 in the cover.

A spring seated vent valve 18 is disposed in the upper end of the bore 17 of the nut to be accessible within the handle of the channel, its stem being protected by the handle. The valve may be of the type commonly used in pneumatic tires. The fit of the nut on the post is such as to permit the passage of air.

The relative diameters of the tank 1 and the receptacle 3 is such as to provide an annular space 19 surrounding the receptacle. The bottom of the receptacle is spaced from the bottom of the tank to provide a mixing chamber 19I into which the annular space 19 opens throughout. The receptacle 3 is provided with a central tube or sleeve 20 projecting upwardly from the bottom thereof which slidably receives the post 8. The sleeve has a portion 23 of reduced internal diameter more closely fitting the post but at the same time there is sufficient clearance between this reduced portion and the post to permit easy assembling and disassembling, the venting of air and the seating of the receptacle against the seat 12 on the cover.

The lower end 21 of the sleeve 20 projects somewhat below the bottom of the receptacle and receives the upper end of the coil spring 22 which is seated on the bottom. The spring acts to urge the receptacle into effective closing or sealing engagement with the annular shoulder or bead 12 of the cover. Pressure of water on the somewhat springable bottom acts to clamp the cover on the tank.

It will be noted that the upper end of the sleeve projects above the top of the receptacle. The sleeve is provided with an opening or port 24 in spaced relation to the bottom of the tank and below the reduced portion 23 of the sleeve. Make-up water from the tank passes upwardly through the sleeve and is discharged into the receptacle through the port or opening 24.

At one side of the receptacle, desirably the side having the inlet connection 4, I provide a suction or eduction tube 25 which opens through the side wall of the receptacle adjacent the top thereof and depends within the receptacle to a point closely adjacent the bottom. To prevent clogging of the tube and the withdrawal of the unsolubilized chemical I provide the tube with a shield or baffle 26, the upper end of which extends above the tube and above the normal chemical level. The lower end of the baffle has a slit-like opening between it and the bottom of the tank as shown at 27. In a practical embodiment of my invention the make-up opening may be of approximately $\frac{1}{16}$ of an inch in diameter and the slit $\frac{1}{32}$ of an inch wide.

The water inlet opening 29 is directed tangentially against the wall of the mixing chamber portion of the tank. This sets up a circular swirling motion both in the mixing chamber portion of the tank below the receptacle and in the annular space 19, the water swirling or flowing across the outlet port of the suction or eduction tube 25 and withdrawing the saturate solution from the receptacle.

The make-up water supplied to the tank combines with the chemical to provide a saturate solution and it is the saturate solution that is drawn by suction induced by the flow of water across the discharge of the eduction tube that withdraws the saturate solution from the receptacle and mixes it with the water in the annular space 19 and in the mixing chamber below the tank. This solution is discharged from the mixing chamber through the nipple 5 which is designed to receive a hose 32 connected to the sprayer device 6 which has a nozzle 33. The discharge is controlled by the valve indicated generally by the numeral 34. The discharge aperture 35 of the sprayer head should be of less capacity than the inlet aperture 29 so as to maintain a supply of water under pressure within the tank.

An example of the weed destroying chemical which may be used is monohydrated sodium salt of dichlorophenory-acetic acid. The saturate solution of this material is heavier than water but it is drawn from the receptacle through the suction or eduction tube 25. Other chemicals may be dispensed or distributed. Certain fertilizer which forms saturate solutions, for example ammonium sulphate and other spray materials may be distributed.

The bottom is preferably provided with a short finger or post 30 which is engageable with the hole in the bottom of the receptacle, the hole being provided with a cover 31.

Where the saturate solution of the chemical is lighter than water the suction or eduction tube 25A is directed upwardly so that the solution is drawn from the top of the receptacle instead of the bottom thereof. For certain materials, for example certain fertilizers, the eduction tube may be omitted and the eduction or suction port 25B provided in the wall of the receptacle (see Fig. 6). The water flowing across this port 25B draws the solution from the receptacle to be mixed in the space 19 and the mixing chamber below the receptacle before being discharged.

In use the material to be distributed in solution is placed in the receptacle and the cover applied. The tank is then connected as by the hose 36 to a suitable source of water supply under pressure. As the water is turned on the vent valve 18 is opened to permit air to be discharged from the tank and receptacle by the incoming water allowing the tank and the receptacle to fill. The discharge is controlled by the valve 34. The tank may be connected to other forms of sprayers or deliverers but for weed destroyers the discharge is desirably manually controlled and directed. This type of sprayer is of advantage particularly for chemicals, such as weed killers, and for many other materials. I have used the term water which is the commonly employed vehicle but other liquids might be used for particular purposes.

I have mentioned that the discharge opening of the nozzle 33 should be of less diameter or capacity than that of the inlet 29. I have found that an inlet jet opening of .042 is satisfactory throughout a wide range of water pressures such as are found in commercial systems. The make-up opening 24 may desirably be $\frac{1}{16}$ of an inch in diameter. When the inlet opening 29 is increased the size of the make-up 24 should desirably be increased. The water mixes in the receptacle with the material to be distributed to form a saturate solution and the solution is drawn from the receptacle by the swirl or flow of the water as described and is mixed with the water in the annular space 19 and the mixing chamber. The space 19 is in effect a part of the mixing chamber but performs the added function of insuring an effective withdrawal of the solution from the tank in proportion to the amount of water passing through or discharged from the tank and is effective in a wide range or variation in water pressures. The applicant has successfully used the apparatus illustrated in variations of pressure from 25 to 75 pounds per square inch and substantial uniformity of the solution delivery is maintained throughout this wide variation.

The rate of swirl in the tank surrounding the receptacle is directly proportional to the pressure of the incoming water and since the suction caused by the swirling water on the eduction port is also proportional to the rate of swirl the volume of the solution drawn through the suction port is proportional to such suction and therefore a uniform concentration of mixture discharged from the apparatus results.

In chemicals which form saturate solutions with water, such for example weed destroyer of the 2-4D type, and since the dissolved portion is heavier than water there is always a supply of the saturate solution at the bottom of the tank and it is drawn by the eduction tube through the slit 27 and discharged through the port. As the solution is drawn out of the receptacle make-up water is delivered to or flows into the receptacle through the make-up opening 24. The saturate solution drawn into the mixing chamber is thoroughly mixed therein and results in great uniformity of the solution delivered.

In Fig. 1 I illustrate the tank in a canted position. This is a natural position for it to assume when carried in view of the weight and pull of the hose and it is also a convenient position for grasping the handle 15. This position has the further advantage that with the eduction tube located at the side to which the hose is attached all chemical solutions will be discharged as it flows down to the low point. The locating post 30 insures this positioning. For distributing fertilizers it is desirable that the tank be increased in dimensions and the receptacle correspondingly increased.

It should be noted that the make-up opening 24 is desirably in approximately the horizontal center of the eduction outlet. This prevents saturate solutions from draining into the mixing chamber when the apparatus is not discharging or is idle.

I have illustrated and described my invention in simple and practical embodiments thereof. I have not attempted to illustrate various modifications and adaptations which I contemplate as it is believed that this disclosure will enable those skilled in the art to embody or adapt my invention as may be desired.

Having thus described my invention, what I claim as new and desire to secure by Letters Patent is:

1. An apparatus of the class described comprising a tank open at the top and having a springable convex bottom, a post mounted centrally on said bottom and threaded at its upper end, a cover adapted to seat on the rim of the tank and having an annular inwardly facing receptacle seat and an opening therein receiving said post, a nut threadedly engageable with said post, an open top receptacle provided with a central tubular sleeve receiving said post, a spring acting to yieldingly urge the rim of the receptacle against the said receptacle seat on said cover, said receptacle being spaced from the bottom of the tank and from the side wall thereof providing a mixing chamber below the receptacle and an annular space surrounding the receptacle open to said mixing chamber, a suction passage opening to said mixing chamber, a supply connection for fluid under pressure opening to the tank exteriorly of the receptacle and directed to induce a swirling movement of liquid in the mixing chamber and in the annular space and across the outlet of the suction passage, a make-up liquid connection for said receptacle to said tanks, means facilitating the positioning of the receptacle within the tank with its suction at the side of the tank having such liquid supply connection, and a discharge for said tank.

2. An apparatus of the class described comprising a tank open at the top, a post mounted centrally on said bottom, a cover adapted to seat on the rim of the tank and having an annular inwardly facing receptacle seat and an opening therein receiving said post, a nut threadedly engageable with said post for clamping said cover upon the tank and provided with a handle, an open top receptacle provided with a central tubular sleeve receiving said post, means acting to yieldingly urge the rim of the receptacle against the said receptacle seat on said cover, said receptacle being spaced from the bottom of the tank and from the side wall thereof providing a mixing chamber below the receptacle and an annular space surrounding the receptacle open to said mixing chamber, a suction passage opening to said annular space and to said receptacle, a supply connection for fluid under pressure opening to the tank exteriorly of the receptacle and directed to induce a swirling movement of liquid in the mixing chamber and in the annular space and across the outlet of the suction passage, and a discharge for said tank.

3. An apparatus of the class described comprising a tank open at the top, a post mounted on said bottom, a cover adapted to seat on the rim of the tank and having an annular inwardly facing receptacle seat and an opening therein receiving said post, a nut threadedly engageable with said post for clamping said cover upon the tank and provided with a handle, an open top receptacle provided with a central tubular sleeve receiving said post, means acting to yieldingly urge the rim of the receptacle against the said receptacle seat on said cover, said receptacle being spaced from the bottom of the tank, a suction passage opening to said mixing chamber, a supply connection for fluid under pressure opening to the tank exteriorly of the receptacle and directed to induce a swirling movement of liquid in the mixing chamber and in the annular space and across the outlet of the suction passage, and a discharge for said tank.

4. An apparatus of the class described comprising a cylindrically walled tank, a cylindrically walled receptacle adapted to receive a soluble material to be mixed with a liquid vehicle, said receptacle being supported centrally within the tank with its bottom in spaced relation to the bottom of the tank and its side wall in spaced concentric relation to the side wall of the tank providing a mixing chamber below the tank and an annular space surrounding the receptacle and communicating throughout with the chamber below the tank, the receptacle having a restricted makeup liquid inlet connection with the mixing chamber opening to the receptacle in substantially spaced relation to the bottom thereof, an eduction tube mounted on the wall of the receptacle and opening to the said annular space adjacent the upper end thereof and depending into the receptacle and opening thereto closely adjacent to the bottom thereof, a guard for the lower end of said eduction tube opening to the receptacle at the top and bottom of the guard, a supply connection for fluid under pressure directed tangentially into the said mixing chamber below the receptacle to induce a swirling movement of the liquid below the receptacle and in the annular space between the tank and the receptacle and across the discharge of the eduction tube, and a discharge for said mixing chamber.

5. An apparatus of the class described comprising a cylindrically walled tank, a cylindrically walled receptacle adapted to receive a soluble material to be mixed with a liquid vehicle, said receptacle being supported centrally within the tank with its bottom in spaced relation to the bottom of the tank and its side wall in spaced concentric relation to the side wall of the tank providing a mixing chamber below the tank and an annular space surrounding the receptacle and communicating throughout with the chamber below the tank, the receptacle having a restricted make-up liquid inlet connection with the mixing chamber opening to the receptacle in substantially spaced relation to the bottom thereof, an eduction tube mounted on the wall of the receptacle and opening to the said annular space adjacent the upper end thereof and depending into the receptacle and opening thereto closely adjacent to the bottom thereof, a supply connection for fluid under pressure directed tangentially into the said mixing chamber below the receptacle to induce a swirling movement of the liquid below the receptacle and in the annular space between the tank and the receptacle and across the discharge of the eduction tube, and a discharge for said mixing chamber.

6. An apparatus of the class described comprising a tank, a receptacle adapted to receive a material to be mixed with a liquid vehicle, said receptacle being supported within the tank with its bottom in spaced relation to the bottom of the tank and its side wall in spaced concentric relation to the side wall of the tank providing a mixing chamber below the tank and an annular space surrounding the receptacle and communicating throughout with the chamber below the tank, the receptacle having a restricted make-up liquid inlet connection with the mixing chamber opening to the receptacle in substantially spaced relation to the bottom thereof, an eduction tube mounted on the wall of the receptacle and opening to the said annular space adjacent the upper end thereof and depending into the receptacle and opening thereto closely adjacent to the bottom thereof, a supply connection for fluid under pressure directed tangentially into the said mixing chamber to induce a swirling movement of the liquid below the receptacle and in the annular space between the tank and the receptacle and across the discharge of the eduction tube, and a discharge for said mixing chamber.

7. An apparatus of the class described comprising a tank, a receptacle adapted to receive a material to be mixed with a liquid vehicle supported within the tank with its bottom in spaced relation to the bottom of the tank and its side wall in spaced relation to the side wall of the tank providing a mixing chamber below the tank and a space surrounding the receptacle and open to the chamber below the tank, the receptacle having a restricted make-up liquid inlet connection with the mixing chamber, a suction passage independent of said make-up inlet and remotely positioned relative thereto opening to the said space surrounding the receptacle and opening to the receptacle adjacent to the bottom thereof, a supply connection for fluid under pressure directed into the said mixing chamber below the receptacle to induce a swirling movement of the liquid below the receptacle and in the space between the tank and the receptacle and across the discharge of the suction passage, and a controllable discharge for said mixing chamber.

8. An apparatus of the class described comprising a mixing chamber, a receptacle for an ingredient to be mixed in solution with a liquid vehicle disposed within said mixing chamber, a supply connection for a liquid vehicle under pressure directed to induce a swirling flow of liquid within the mixing chamber, said receptacle having a discharge port in the side thereof and in spaced relation to its bottom, a make-up connection for said receptacle to said mixing chamber opening to the mixing chamber in spaced relation to its bottom and independent of and remotely positioned relative to said discharge port, and a discharge for the mixing chamber of less capacity than the capacity of the liquid inlet connection.

9. An apparatus for mixing and distributing soluble chemicals to produce a saturate solution comprising a tank, a receptacle for such soluble chemicals supported within the tank to provide a mixing chamber externally of the receptacle, a suction port for the receptacle opening to said mixing chamber, a supply connection for liquid under pressure opening to the tank exteriorly of the receptacle and directed to induce a flow of the liquid across the said discharge port, and a make-up connection for the receptacle in communication with the mixing chamber independent of and remotely positioned relative to said suction port, and a discharge for the tank.

10. An apparatus for distributing soluble chemicals adapted to produce saturate liquid solutions of the chemical comprising a mixing chamber, a receptacle for such chemical supported within the mixing chamber, an eduction tube opening to the mixing chamber and to said receptacle adjacent the bottom thereof, a supply connection for a liquid vehicle under pressure directed to induce a flow of liquid across the discharge of the eduction tube thereby inducing suction within the eduction tube to draw saturate solution therethrough and into the mixing chamber, and a liquid make-up connection for said receptacle to said mixing chamber whereby the liquid within the receptacle is under the same pressure as the liquid within the mixing chamber, said make-up connection being independent of and remotely positioned relative to the inlet of said eduction tube.

11. An apparatus for distributing soluble chemicals adapted to produce saturate liquid solutions of the chemical comprising a mixing chamber, a receptacle for such chemical supported within the mixing chamber, an eduction discharge port for the receptacle opening to the mixing chamber, a supply connection for a liquid vehicle under pressure directed to induce a flow of liquid across sad discharge port and thereby draw saturate solution therethrough and into the mixing chamber, and a liquid make-up connection for said receptacle to said mixing chamber whereby the liquid within the receptacle is under the same pressure as the liquid within the mixing chamber and independent of and remotely positioned relative to said discharge port.

12. An apparatus of the class described comprising a mixing chamber, a receptacle supported within said mixing chamber, the receptacle being provided with a restricted liquid make-up connection opening thereto in spaced relation from the bottom thereof, an eduction passage opening to said receptacle adjacent the bottom thereof and to the mixing chamber in spaced relation to the bottom of the receptacle, a liquid supply connection for supplying liquid under pressure directed into the mixing chamber directed to induce a flow of liquid across the outlet of the eduction passage to induce suction therein for withdrawing liquid from the receptacle, and a discharge for said mixing chamber remotely positioned relative to said opening of said eduction passage to said mixing chamber.

13. An apparatus of the class described comprising a tank, a receptacle supported within the tank in spaced relation to the walls of the tank to provide a mixing chamber exteriorly of the receptacle, the receptacle being provided with a liquid make-up connection with the liquid in the mixing chamber, a discharge port for the receptacle opening to the mixing chamber, the said make-up connection and discharge port being independent and remotely positioned relative to each other and a liquid supply connection for liquid under pressure directed into the mixing chamber to induce a flow of liquid across the discharge port to induce suction at the discharge port for withdrawing liquid from the receptacle.

14. An apparatus of the class described comprising a tank, a receptable for material to be mixed with a liquid vehicle supported within the tank in spaced relation to the side wall thereof providing an annular space between the tank and receptacle, a suction discharge port for said receptacle opening to said annular space adjacent the top thereof and to the receptacle adjacent the bottom thereof, a supply connection for fluid under pressure opening to the tank exteriorly of the receptacle and directed to induce a swirling movement of the liquid in the annular space and across said discharge, said receptacle haviing a restricted make-up liquid connection with the fluid from the supply connection independent of said discharge port and remotely positioned relative thereto, and a discharge for said tank.

IRVING E. ASKE.

REFERENCES CITED

The following references are of record in the file of this patent:

UNITED STATES PATENTS

| Number | Name | Date |
|---|---|---|
| 1,185,319 | Hodell | May 30, 1916 |
| 1,611,773 | Parnell | Dec. 21, 1926 |
| 1,923,266 | Houpert | Aug. 22, 1933 |
| 2,030,278 | Thorne | Feb. 11, 1936 |
| 2,044,821 | Urban | June 23, 1936 |
| 2,142,947 | Kretzochmar et al. | Jan. 3, 1939 |
| 2,178,735 | Behrman | Nov. 7, 1939 |
| 2,348,334 | Ellinger | May 9, 1944 |

FOREIGN PATENTS

| Number | Country | Date |
|---|---|---|
| 235,115 | Germany | June 3, 1911 |